Jan. 9, 1945.    L. E. DIMOND    2,366,710
SAUSAGE CASING
Filed Sept. 2, 1942
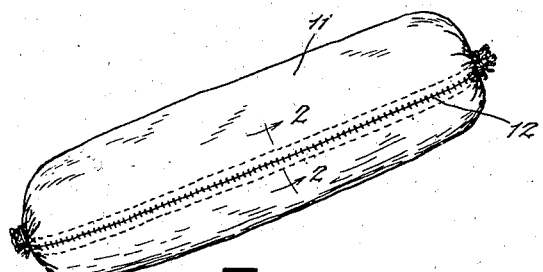
Fig.1.
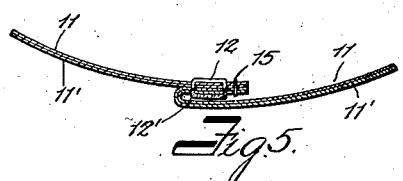
Fig.5.
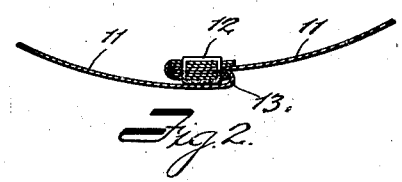
Fig.2.
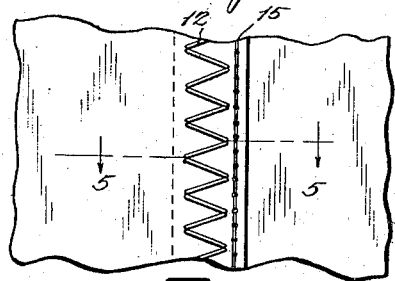
Fig.6.
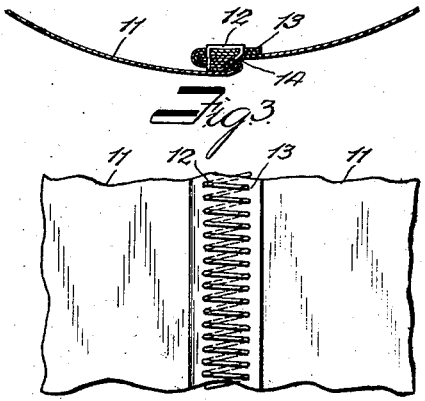
Fig.3.
Fig.4.
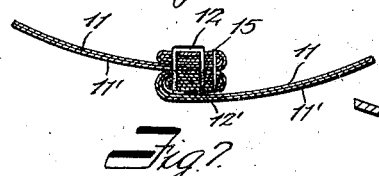
Fig.7.
Fig.9.
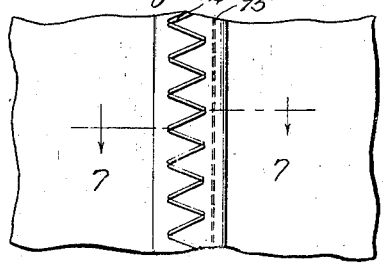
Fig.8.
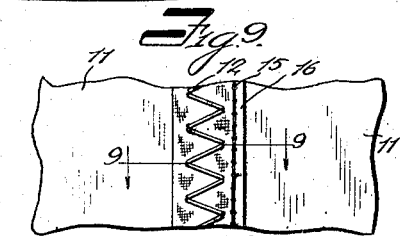
Fig.10.
Inventor:
Lloyd E. Dimond
By Thiess, Olson & Mecklenburger
Attys.

Patented Jan. 9, 1945

2,366,710

UNITED STATES PATENT OFFICE 2,366,710

SAUSAGE CASING

Lloyd E. Dimond, Portsmouth, Va.

Application September 2, 1942, Serial No. 457,047

7 Claims. (Cl. 99—176)

The present invention relates to an improved form of sausage casing composed of a suitable fabric, and having at least one seam in which the stitching is elastic. Sausage casings are made either of natural or of artificial materials, that is to say they are either made of natural gut derived from the intestines of various animals, or it is made up of artificial materials such as suitable fabrics, among which are woven materials and various form of paper, parchment, parchment paper, and the like.

Particularly for the manufacturer of the larger sausage and preserved meats it has already been proposed to produce various types of casings made of parchmentized paper, which has been sewed into the form of a tubular envelope and into which the filling of meat and the like has been suitably stuffed. There is, however, a serious difficulty with such fabric or parchment paper casings namely the fact that when the sausage is subsequently processed or pasteurized or otherwise heat treated, the filling material has a tendency to expand, which expansion is to a great extent counteracted by the relative non-yieldability of the casing. While under the influence of moisture and heat the parchment will expand and swell. It will, however, not again contract. On the other hand if, on cooling, the interior of the sausage contracts, then again the envelope will not partake of the contraction. In either event, therefore, the interior of the sausage will tend to shrink away from the casing, or if there is sufficient adhesion between the interior and the casing, the latter will contract with it. All of these various phenomena contribute to the formation of longitudinal as well as transverse wrinkles, which makes sausages thus packed quite unattractive in appearance. Furthermore, if there has been any printing or decoration applied to the casing material, the wrinkling distorts it and makes it unsightly.

Attempts have also been made in the past to produce casings out of inherently extensible or elastic material such as various types of plastics and even thin sheets of rubber. In the case of rubber, however, such rubber is adversely affected by the curing and heating of the sausage.

It is one of the objects of the present invention to overcome the defects of fabric sausage casings, particularly when they are made of a relatively non-extensible material, such as parchment paper or the like, by the expedient of having in the casing at least one seam made with an extensible and contractible material, that is to say an elastic material.

A further object of the present invention is to produce a substantially tubular sausage casing, made for example of parchment paper, which has been sewed together so as to be provided with a longitudinal seam in which the stitching is elastic. Such stitching suitably may be made with so-called elastic, rubber or rubberized thread.

A number of details of construction are illustrated in the annexed drawing, without, however, hereby wishing to limit the invention to the particular constructional details therein shown.

In the drawing:

Fig. 1 is a perspective view of a completely filled sausage casing made in accordance with the present invention;

Figs. 2, 3 and 4 are closely related, Fig. 2 being a partial section on an enlarged scale of the fabric and its associated stitching shown along the lines 2—2 of Fig. 1;

Fig. 3 is a similar view showing the fabric and stitching when under tension as when the interior of the sausage expands;

Fig. 4 is a partial interior view on approximately the same scale of Figs. 2 and 3, showing the appearance of the stiching when seen from the inside of the casing;

Figs. 5 and 6 are, respectively, and both on the same scale, a cross section of the fabric and stitching and an inside plan view;

Figs. 7 and 8, also on substantially the same scale, show further modifications of the stitching and methods of folding the fabric;

Figs. 9 and 10 are also related, showing in Fig. 10 the use of a heavier woven reinforcement applied to a parchment paper envelope, the manner of stitching being shown in Fig. 9 in cross section.

While for some purposes the casing of the present invention may be composed of a woven fabric, it is in its preferred embodiment, however, made of one or two thicknesses of parchment or parchmentized paper, preferably the latter. The casing may be either single or double, and the essential feature in any case is the existence of a tubular envelope with a seam made by suitably overlapping the parchment paper and then securing it by stitching which is at least in part made with elastic thread, which for most purposes may be of the type known as rubberized thread. This thread, while capable of yielding considerably under tension, tends to return to its original dimensions when the force causing its elongation no longer acts.

Referring more particularly to Figs. 1, 2, 3 and 4, it will be seen that the sausage casing 11 is provided with a longitudinal seam 12. This seam is produced by overlapping the parts 11 of the casing material into a suitable seam 13 which is sewed by means of rubberized thread 12.

In manufacturing the casings the paper or other fabric of which it is made is folded back upon itself to form a seam which is then stitched for example in the manner shown in Fig. 4. The casing is then reversed, that is to say, turned inside out, and in Fig. 4 the seam is shown lying flat against the inside of the casing, presenting the general appearance shown in the figure. When the sausage has been stuffed, care should be taken not to exceed an amount of material which will just snugly fill the casing thereby partially stretching the elastic thread 12. This partial stretching provides circumferential take-up in the casing to prevent wrinkling due to ultimate shrinkage losses of the meat during processing, while the remaining stretch left in the seam provides for a subsequent swelling of the meat during the cooking process. A little practice will enable an operator to ascertain how much to stretch the seam when stuffing to prevent breakage on subsequent heat processing and also to prevent wrinkles in the finished product. The sausage is then processed or pasteurized, causing a certain amount of expansion which will exert a pulling force upon the thread 12 which will yield, as is attempted to be indicated in Fig. 3 at the point 14. When the sausage subsequently cools the retractive force of the elasticity of the threads 12 will tend to pull the threads back into the position shown in Figs. 2 and 4, so that therefore the sausage casing will again lie smoothly against the contents of the sausage, thereby preventing a wrinkled appearance which it is the object of the present invention to avoid.

Further modification is shown in Figs. 5 and 6 where the walls consist of two layers 11 and 11' so as to provide a double thickness of casing. Furthermore, in addition to elastic stitching 12 there is also a non-elastic stitching 15, which serves to protect the sausage against leakage of meat when the elastic seam opens up due to stretching.

In the form shown in Figs. 5 and 6, a zigzag stitching is employed, one thread 12 being elastic while the other thread 12' is non-elastic.

By reason of the elastic stitching 12 being in the zigzag form, a considerable amount of stretching can take place without danger of bursting the casing during the processing steps. In Figs. 7 and 8 there is shown a still further modification, here again there being the double layers 11 and 11', but with the seam being in a number of folds, but using both the elastic stitching 12 and the non-elastic stitching 12' and 15. The inside plan view of this construction is shown in greater detail in Fig. 8.

Figs. 9 and 10 show a still further modification in which there is used a single layer 11 of, say, parchment paper, but where the seam is reinforced by means of a woven fabric 16 which is adhesively secured to the parchment paper 11, the entire assembly then being sewn by means of the elastic threads 12 and the non-elastic threads 12' and 15 in a manner similar to what is shown in Figs. 5, 6, 7 and 8. A suitable adhesive for securing the woven fabric 16 to the parchment paper 11 may be a self-curing urea-formaldehyde condensation product type of synthetic plastic adhesive which is preferably cured before the stitching is effected.

While the invention has been illustrated with the seams reversed so that they are on the inside of the casing, the invention is by no means limited to such construction, as self-evidently the seam can be allowed to remain visible on the outside, thereby forming a sort of handle or tab by which the sausage casing may be grasped and removed from each individual slice, after the slices are cut off, etc.

A particular advantage of the double construction shown in Figs. 5 through 8 lies in the fact that the interior casing may be provided on its eventual outside with suitable printing or ornamental indicia, while the outermost layer may be plain so that when the sausage is processed the printed matter will not be injured. After the processing the outer layer may then be stripped off, leaving the interior layer clean and presentable, thereby rendering the sausage more attractive to the consumer in appearance.

While rubberized thread has been indicated as being the material used for effecting the sewing in the seams, straight rubber thread or similar elastic material may be substituted without departing from the scope of the present invention.

I claim:

1. A sausage casing composed of a fabric having at least one longitudinal seam consisting of elastic thread so arranged that said seam is stretchable only in a direction transversely of said seam.

2. A sausage casing made of one or more thicknesses of parchment paper and having at least one longitudinal seam stretchable only in a direction transversely of said seam and comprising one elastic thread and one substantially non-elastic thread.

3. A sausage casing made of one or more thicknesses of parchment paper and having at least one longitudinal seam comprising rubber thread so arranged as to make the seam stretchable only in a direction transversely of said seam.

4. A sausage casing made of a fabric and having a longitudinal seam consisting of overlapping portions held together by elastic thread so arranged as to be stretchable only in a direction transversely of said seam.

5. The sausage casing of claim 4 where the seam is reinforced by additional layers of fabric.

6. The sausage casing of claim 4 where the seam is reinforced by additional layers of fabric adhesively secured to the main body of the fabric.

7. A tubular parchment-paper comestible envelope having at least one only transversely stretchable longitudinal seam sewed with rubber thread.

LLOYD E. DIMOND.